United States Patent
Kashima et al.

(10) Patent No.: US 11,680,156 B2
(45) Date of Patent: Jun. 20, 2023

(54) POLYIMIDE PRECURSOR-CONTAINING AQUEOUS COMPOSITION, METHOD FOR PRODUCING POLYIMIDE FILM, AND METHOD FOR PRODUCING POROUS POLYIMIDE FILM

(71) Applicant: FUJIFILM Business Innovation Corp., Tokyo (JP)

(72) Inventors: Yasunobu Kashima, Kanagawa (JP); Kosaku Yoshimura, Kanagawa (JP); Tomoya Sasaki, Kanagawa (JP); Kosuke Nakada, Kanagawa (JP); Hidekazu Hirose, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 262 days.

(21) Appl. No.: 17/149,724

(22) Filed: Jan. 15, 2021

(65) Prior Publication Data
US 2021/0238392 A1    Aug. 5, 2021

(30) Foreign Application Priority Data

Jan. 30, 2020 (JP) .............................. JP2020-013959
Aug. 26, 2020 (JP) .............................. JP2020-142665

(51) Int. Cl.
*C08L 71/02* (2006.01)
*C08J 5/18* (2006.01)
*C08L 79/08* (2006.01)
*C08L 1/10* (2006.01)
*C08J 9/26* (2006.01)

(52) U.S. Cl.
CPC .................. *C08L 1/10* (2013.01); *C08J 5/18* (2013.01); *C08J 9/26* (2013.01); *C08L 71/02* (2013.01); *C08J 2301/10* (2013.01); *C08J 2371/02* (2013.01); *C08J 2425/06* (2013.01); *C08J 2433/12* (2013.01); *C08J 2479/08* (2013.01); *C08L 2205/03* (2013.01)

(58) Field of Classification Search
CPC ........ C08L 1/10; C08L 71/02; C08L 2205/03; C08L 1/286; C08J 5/18; C08J 9/26; C08J 2301/10; C08J 2371/02; C08J 2425/06; C08J 2433/12; C08J 2479/08; C08J 2201/046; C08J 2379/08; C08J 2401/00; C08J 2471/02; C08J 9/0085; C08J 9/0061
See application file for complete search history.

(56) References Cited

FOREIGN PATENT DOCUMENTS

| CN | 107325472 A | * | 11/2017 | ............ C08F 271/00 |
| JP | H07292248 A | * | 11/1995 | |
| JP | 2012077144 A | * | 4/2012 | |
| JP | 2016056225 | | 4/2016 | |

* cited by examiner

*Primary Examiner* — K. Boyle
(74) *Attorney, Agent, or Firm* — JCIPRNET

(57) ABSTRACT

A polyimide precursor-containing aqueous composition contains at least one polymer material selected from the group consisting of a water-insoluble fibrous organic substance and a polyalkylene oxide having a viscosity-average molecular weight of 5 million or more, a polyimide precursor, particles, and water.

14 Claims, 3 Drawing Sheets

POLYIMIDE PRECURSOR-CONTAINING AQUEOUS COMPOSITION, METHOD FOR PRODUCING POLYIMIDE FILM, AND METHOD FOR PRODUCING POROUS POLYIMIDE FILM

CROSS-REFERENCE TO RELATED APPLICATIONS

This application is based on and claims priority under 35 USC 119 from Japanese Patent Application No. 2020-013959 filed Jan. 30, 2020 and Japanese Patent Application No. 2020-142665 filed Aug. 26, 2020.

BACKGROUND

(i) Technical Field

The present invention relates to a polyimide precursor-containing aqueous composition, a method for producing a polyimide film, and a method for producing a porous polyimide film.

(ii) Related Art

Polyimide resin is a material with excellent mechanical strength, chemical stability, and heat resistance, and polyimide films with these properties are attracting attention.

The polyimide film may be applied to filter applications (for example, filtration filters, oil filters, fuel filters), secondary battery applications (for example, separators of lithium secondary batteries, holders of solid electrolytes in all-solid-state batteries), and the like.

For example, JP2016-056225A discloses a varnish for producing a porous film containing at least one resin (A) selected from the group consisting of a polyamic acid, a polyimide, a polyamideimide precursor, and a polyamide-imide, fine particles (B), and a silicon atom and/or a fluorine atom-containing surfactant (C) having an alkylene oxide chain.

SUMMARY

In a case where a polyimide film is produced using a polyimide precursor-containing aqueous composition containing a polyimide precursor, particles, and water, in a case in which the particles settle or surface during the production process, the amount of particles varies in the thickness direction of the polyimide film.

In a case where the amount of particles varies in the thickness direction of the polyimide film, the physical properties may differ in the thickness direction of the polyimide film (for example, in the case of a porous polyimide film, the porosity changes in the thickness direction), which is undesirable.

An object of the present invention is to provide a polyimide precursor-containing aqueous composition capable of preventing particles from settling in the process of producing a polyimide film in comparison with the case containing a polyimide precursor, carboxymethyl cellulose being a polyalkylene oxide having a viscosity-average molecular weight of less than 5 million or a water-insoluble fibrous organic substance, particles, and water.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

The object is achieved by the following aspects. That is, according to an aspect of the present disclosure, there is provided a polyimide precursor-containing aqueous composition, containing: at least one polymer material selected from the group consisting of a water-insoluble fibrous organic substance and a polyalkylene oxide having a viscosity-average molecular weight of 5 million or more; a polyimide precursor; particles; and water.

BRIEF DESCRIPTION OF THE DRAWINGS

Exemplary embodiment(s) of the present invention will be described in detail based on the following figures, wherein.

DETAILED DESCRIPTION

Figure 1:
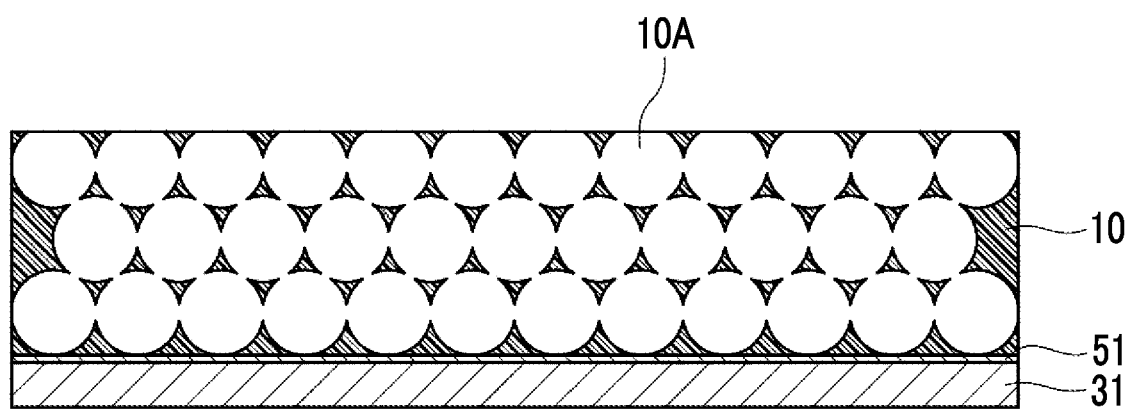
FIG. 1 is a schematic view showing a porous polyimide film produced by using a polyimide precursor-containing aqueous composition according to the present exemplary embodiment.

Hereinafter, exemplary embodiments of the present invention will be described in detail.

In the present exemplary embodiment, the "film" is a concept that encompasses not only what is generally called "membrane" but also what is commonly called "sheet".

Further, in the present exemplary embodiment, the "solid content" refers to a component excluding water and a water-soluble organic solvent (that is, an aqueous solvent).

Polyimide Precursor-Containing Aqueous Composition

A polyimide precursor-containing aqueous composition according to the present exemplary embodiment (hereinafter, also referred to as "aqueous composition according to the present exemplary embodiment") contains at least one polymer material selected from the group consisting of a water-insoluble fibrous organic substance and a polyalkylene oxide having a viscosity-average molecular weight of 5 million or more, a polyimide precursor, particles, and water.

The "aqueous composition" as used herein means a composition containing water and having a total content of water and a water-soluble organic solvent (that is, an aqueous solvent) of 50% by mass or more with respect to the total mass of the aqueous composition according to the present exemplary embodiment.

The aqueous composition according to the present exemplary embodiment having the above configuration can prevent particles from settling or surfacing in the process of producing the polyimide film.

The reason is not clear, but it is presumed as follows.

The polyalkylene oxide having a viscosity-average molecular weight of 5 million or more contained in the aqueous composition according to the present exemplary embodiment is considered to have a high-molecular-weight and contains a large amount of alkylene oxide (that is, a structural unit represented by —($C_mH_{2m}O$)—, where m represents an integer of 2 or more), and therefore, the molecules in close proximity interact with each other in the aqueous composition containing water and form a network structure.

In addition, the water-insoluble fibrous organic substance maintains the network structure by the cohesion of intersections due to the intertwining of fibers, even in aqueous compositions containing water.

Therefore, it is presumed that the particles in the aqueous composition according to the present exemplary embodiment are captured by the network structure described above and are prevented from settling or surfacing.

In particular, a water-insoluble fibrous organic substance and/or a polyalkylene oxide having a viscosity-average molecular weight of 5 million or more may prevent the particles from settling or surfacing with a small amount of addition, and therefore, it is presumed that they are less likely to increase the viscosity of the aqueous composition of the present exemplary embodiment and, furthermore, less likely to affect the physical properties of the polyimide film (including the porous polyimide film) produced.

Polyimide Precursor

An aqueous composition according to the present exemplary embodiment contains a polyimide precursor.

The polyimide precursor is a resin (polyimide precursor) having a repeating unit represented by the general formula (I).

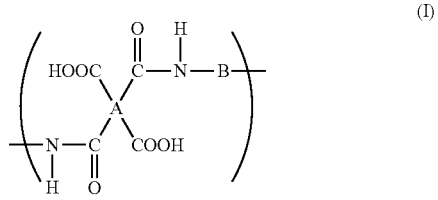

(In the general formula (I) A represents a tetravalent organic group and B represents a divalent organic group.)

Here, in the general formula (I), the tetravalent organic group represented by A is a residue obtained by removing four carboxyl groups from the tetracarboxylic dianhydride used as a raw material.

On the other hand, the divalent organic group represented by B is a residue obtained by removing two amino groups from the diamine compound used as a raw material.

That is, the polyimide precursor having a repeating unit represented by the general formula (I) is a polymer of a tetracarboxylic dianhydride and a diamine compound.

Examples of the tetracarboxylic dianhydride include both aromatic and aliphatic compounds thereof, and preferred are aromatic compounds thereof, for example. That is, in the general formula (I), the tetravalent organic group represented by A is, for example, preferably an aromatic organic group.

Examples of the aromatic tetracarboxylic dianhydride include pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylethertetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furanetetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropyridene diphthalic dianhydride, 3,3',4,4'-biphenyltetracarboxylic dianhydride, 2,3,3',4'-biphenyltetracarboxylic dianhydride, bis(phthalic) phenylphosphine oxide dianhydride, p-phenylene-bis(triphenylphthalic)dianhydride, m-Phenylene-bis(triphenylphthalic)dianhydride, bis(triphenylphthalic)-4,4'-diphenyl ether dianhydride, and bis(triphenylphthalic)-4,4'-diphenylmethane dianhydride.

Examples of the aliphatic tetracarboxylic dianhydride include aliphatic or alicyclic tetracarboxylic dianhydride such as butane tetracarboxylic dianhydride, 1,2,3,4-cyclobutane tetracarboxylic dianhydride, 1,3-dimethyl-1,2,3,4-cyclobutane tetracarboxylic dianhydride, 1,2,3,4-cyclopentane tetracarboxylic dianhydride, 2,3,5-tricarboxycyclopentyl acetic dianhydride, 3,5,6-tricarboxynorbornane-2-acetic dianhydride, 2,3,4,5-tetrahydrofuran tetracarboxylic dianhydride, 5-(2,5-dioxotetrahydrofuryl)-3-methyl-3-cyclohexene-1,2-di carboxylic dianhydride, and bicyclo[2,2,2]-oct-7-ene-2,3,5,6-tetracarboxylic dianhydride; an aliphatic tetracarboxylic dianhydride having an aromatic ring such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione; and the like.

Among these, the tetracarboxylic dianhydride is, for example, may be, for example, an aromatic tetracarboxylic dianhydride, and specifically, may be, for example, pyromellitic dianhydride, 3,3',4,4'-biphenyltetracarboxylic dianhydride, 2,3,3',4'-biphenyltetracarboxylic dianhydride, 3,3',4,4'-biphenyltetracarboxylic dianhydride, and 3,3',4,4'-benzophenonetetracarboxylic dianhydride, pyromellitic dianhydride, 3,3',4,4'-biphenyltetracarboxylic dianhydride, and 3,3',4,4'-benzophenonetetracarboxylic dianhydride, and in particular, may be 3,3',4,4'-biphenyltetracarboxylic dianhydride.

The tetracarboxylic dianhydride may be used alone or in combination of two or more kinds thereof.

In addition, in a case of the combination use of two or more kinds thereof, the aromatic tetracarboxylic dianhydride or the aliphatic tetracarboxylic acid may be used in combination, or the aromatic tetracarboxylic dianhydride and the aliphatic tetracarboxylic dianhydride may be combined to be used.

On the other hand, the diamine compound is a diamine compound having two amino groups in the molecular structure. Examples of the diamine compound include both aromatic and aliphatic compounds thereof, and preferred are aromatic compounds thereof, for example. That is, in the general formula (I), the divalent organic group represented by B is, for example, preferably an aromatic organic group.

Examples of the diamine compound include aromatic diamines such as p-phenylenediamine, m-phenylenediamine, 4,4'-diaminodiphenylmethane, 4,4'-diaminodiphenylethane, 4,4'-diaminodiphenylether, 4,4'-diaminodiphenylsulfide, 4,4'-diaminodiphenylsulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenylether, 2,7-diaminofluorene, 2,2-bis(4- aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl] propane, 2,2-bis[4-(4-aminophenoxy)phenyl] hexafluoropropane, 1,4-bis(4-aminophenoxy)benzene, 4,4'-bis(4-aminophenoxy)-biphenyl, 1,3'-bis(4-aminophenoxy) benzene, 9,9-bis(4-aminophenyl)fluorene, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, and 4,4'-bis[4-(4-amino-2-trifluoromethyl)phenoxy]-octafluorobiphenyl; aromatic diamines having two amino groups bonded to an aromatic ring and hetero atoms other than nitrogen atoms of the amino groups such as diaminotetraphenyl thiophene; and aliphatic and alicyclic diamines such as 1,1-metaxylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylene dimethylenediamine, tricyclo[6,2,1, $0^{2.7}$]-undecylene dimethyldiamine, and 4,4'-methylenebis (cyclohexylamine).

Among these, the diamine compound may be, for example, an aromatic diamine compound, specifically, may be p-phenylenediamine, m-phenylenediamine, 4,4'-diaminodiphenylmethane, 4,4'-diaminodiphenyl ether, 3,4'-diaminodiphenyl ether, 4,4'-diaminodiphenyl sulfide, and 4,4'-diaminodiphenyl sulfone, and in particular, may be 4,4'-diaminodiphenyl ether, and p-phenylenediamine.

The diamine compound may be used alone or in combination of two or more kinds thereof. In addition, in a case of the combination use of two or more kinds thereof, aromatic diamine compounds or aliphatic diamine compounds may be used in combination, or aromatic diamine compounds and aliphatic diamine compounds may be combined to be used.

The weight-average molecular weight of the polyimide precursor used in the present exemplary embodiment is, for example, preferably 5000 or more and 300,000 or less, and more preferably 10,000 or more and 150,000 or less.

The weight-average molecular weight of the polyimide precursor is measured by a gel permeation chromatography (GPC) method under the following measurement conditions.

Column: Tosoh TSK gel α-M (7.8 mm I.D×30 cm)
Eluent: DMF (dimethylformamide)/30 mM LiBr/60 mM phosphoric acid
Flow rate: 0.6 mL/min
Injection volume: 60 μL
Detector: RI (differential refractive index detector)

The content of the polyimide precursor is, for example, preferably 0.1% by mass or more and 10% by mass or less, and more preferably 0.5% by mass or more and 8% by mass or less, with respect to the total mass of the aqueous composition according to the present exemplary embodiment.

Particles

The aqueous composition according to the present exemplary embodiment contains particles.

The particles contained in the aqueous composition according to the present exemplary embodiment refer to particles in a state of being dispersed without being dissolved.

The particles may be any particles not dissolving in the aqueous composition according to the present exemplary embodiment, and the material for the particles is not particularly limited, but the particles can be classified into resin particles and inorganic particles, which will be described later.

Here, in the present exemplary embodiment, "particles not dissolving" includes, in addition to that the particles not dissolving in the target liquid (specifically, a solvent containing water contained in the polyimide precursor-containing aqueous composition) at 25° C., that the particles dissolve in the range of 3% by mass or less in the target liquid.

Further, the particles may be contained in the polyimide film produced by using the aqueous composition according to the present exemplary embodiment, or may be removed from the produced polyimide film.

The volume-average particle size D50v of the particles is not particularly limited. The volume-average particle size D50v of the particles may be, for example, 0.1 μm or more and 10 μm or less. The lower limit of the volume-average particle size D50v of the particles may be 0.2 μm or more, 0.3 μm or more, 0.4 μm or more, or 0.5 μm or more. Further, the upper limit of the volume-average particle size D50v of the particles may be 7 μm or less, 5 μm or less, 3 μm or less, or 2 μm or less.

The volume particle size distribution index (GSDv) of the particles is, for example, preferably 1.30 or less, more preferably 1.25 or less, and most preferably 1.20 or less.

The particle size distribution of the particles in the aqueous composition according to the present exemplary embodiment is measured by the following method.

The composition to be measured is diluted and the particle size distribution of the particles in the liquid is measured using Coulter counter LS13 (manufactured by Beckman Coulter). Based on the measured particle size distribution, the volume cumulative distribution is drawn from the small diameter side with respect to the divided particle size range (channel) to measure the particle size distribution.

In the volume cumulative distribution drawn from the small diameter side, the particle size with a cumulative total of 16% is defined as the volume particle size D16v, the particle size with a cumulative total 50% is defined as the volume-average particle size D50v, and the particle size with a cumulative total 84% is defined as the volume particle size D84v.

Then, the volume particle size distribution index (GSDv) of the particles is calculated as $(D84v/D16v)^{1/2}$ from the particle size distribution obtained by the above method.

In a case where the particle size distribution of the particles in the aqueous composition according to the present exemplary embodiment is difficult to measure by the above method, the particle size distribution may be measured by a method such as a dynamic light scattering method.

The shape of the particles may be, for example, spherical.

In a case where the porous polyimide film is produced by removing the particles from the polyimide film using the spherical particles, a porous polyimide film having spherical pores can be obtained.

In the present exemplary embodiment, the "spherical" in the particle encompasses both spherical and substantially spherical (a shape close to a spherical shape) shapes.

Specifically, it means that the proportion of particles having a major axis to minor axis ratio (major axis/minor axis) of 1 or more and less than 1.5 is more than 80%. The proportion of particles having a major axis to minor axis ratio (major axis/minor axis) of 1 or more and less than 1.5 is, for example, preferably 90% or more. The closer the major axis to minor axis ratio approaches 1, the more spherical the particles become.

As the particles, either resin particles or inorganic particles may be used, but for example, it is preferable to use resin particles for the following reasons.

Since the resin particles and the polyimide precursor are both organic materials, particle dispersibility in the polyimide precursor-containing aqueous composition or in the coating film by the polyimide precursor-containing aqueous composition, interfacial adhesion with the polyimide precursor, and the like are easily improved as compared with the case where the inorganic particles are used. Further, in the imidization step in the case of producing the polyimide film, since the resin particles easily absorb the volume shrinkage, it is easy to prevent cracks generated in the polyimide film due to the volume shrinkage.

Hereinafter, specific materials of the resin particles and the inorganic particles will be described.

Resin Particles

The resin particles are not particularly limited as long as the resin particles do not dissolve in the polyimide precursor-containing aqueous composition (specifically, the solvent containing water contained in the polyimide precursor solution). For example, resin particles made of a resin other than polyimide are preferred.

Specific examples of the resin particles include vinyl-based resins represented by polystyrenes, poly(meth)acrylic acids, polyvinylacetate, polyvinyl alcohol, polyvinylbutyral, polyvinylether, and the like; condensation resins represented by polyesters, polyurethanes, polyamides and the like; hydrocarbon resins such as polyethylene, polypropylene, and polybutadiene; fluororesins represented by polytetrafluoroethylene, polyvinyl fluoride and the like; and the like.

Here, "(meth)acrylic" means to include both "acrylic" and "methacrylic". Further, the (meth)acrylic acids include (meth)acrylic acid, (meth)acrylate, and (meth)acrylamide.

Further, the resin particles may or may not be crosslinked.

In a case where the resin particles are resin particles made of vinyl-based resin, the resin particles can be obtained by addition polymerization of a monomer.

Examples of the monomer for obtaining a vinyl-based resin include styrenes having a styrene skeleton such as styrene, an alkyl-substituted styrene (for example, α-methylstyrene, 2-methylstyrene, 3-methylstyrene, 4-methylstyrene, 2-ethylstyrene, 3-ethylstyrene, or 4-ethylstyrene), a halogen-substituted styrene (for example, 2-chlorostyrene, 3-chlorostyrene, or 4-chlorostyrene), or vinylnaphthalene; (meth)acrylates such as methyl (meth)acrylate, ethyl (meth)acrylate, n-propyl (meth)acrylate, n-butyl (meth)acrylate, lauryl (meth)acrylate, or 2-ethylhexyl (meth)acrylate; vinyl nitriles such as acrylonitrile or methacrylonitrile; vinyl ethers such as vinyl methyl ether or vinyl isobutyl ether; vinyl ketones such as vinyl methylketone, vinyl ethyl ketone or vinyl isopropenyl ketone; acids such as (meth)acrylic acid, maleic acid, cinnamic acid, fumaric acid, or vinylsulfonic acid; and bases such as ethyleneimine, vinylpyridine, or vinylamine.

The vinyl-based resin may be a resin which is obtained using one monomer among these monomers, or may be a copolymer which is obtained using two or more monomers among these monomers.

Examples of other monomers which may be used in combination include: monofunctional monomers such as vinyl acetate; bifunctional monomers such as divinylbenzene, ethylene glycol dimethacrylate, nonane diacrylate, or decanediol diacrylate; and polyfunctional monomers such as trimethylolpropane triacrylate or trimethylolpropane trimethacrylate.

By using the bifunctional monomer and the polyfunctional monomer in combination, crosslinked resin particles can be obtained.

The resin particles are preferably resin particles made of, for example, polystyrenes, poly (meth)acrylic acids, or polyesters, and more preferably polystyrene, styrene-(meth)acrylic acid copolymers, or resin particles made of poly (meth)acrylic acids, from the viewpoint of producability and adaptability of the particle removal step described later.

Here, polystyrenes are resins containing a structural unit derived from a styrene-based monomer (a monomer having a styrene skeleton). More specifically, polystyrenes contain, for example, preferably 30 mol % or more, and still more preferably 50 mol % or more, when the total of the structural units constituting the resin is 100 mol %.

The poly(meth)acrylic acids means methacrylic resins and acrylic resins, and are resins containing a structural unit derived from a (meth)acrylic monomer (a monomer having a (meth)acryloyl skeleton). More specifically, poly(meth) acrylic acids contain, for example, preferably 30 mol % or more, and still more preferably 50 mol % or more, when the total ratio of the structural units derived from (meth)acrylic acid and/or the structural units derived from (meth)acrylate is 100 mol % in the composition of polymer. Further, polyesters are resins obtained by polycondensing a polycarboxylic acid and a polyhydric alcohol and having an ester bond in the main chain.

The resin particles are, for example, preferably resin particles made of a resin containing a structural unit derived from styrene, from the viewpoint that the difference in specific gravity with the liquid is small and the movement of the particles can be easily suppressed, and the structural unit derived from styrene, for example, in a case where the total of the structural units constituting the resin is 100 mol %, is preferably contained in an amount of 30 mol % or more, more preferably in an amount of 50 mol % or more, still more preferably in an amount of 80 mol % or more, and particularly preferably in an amount of 100 mol %.

These resin particles may be used alone or in combination of two or more kinds thereof.

The shape of the resin particles is preferably maintained, for example, in the process of producing the aqueous composition according to the present exemplary embodiment, and in the process of coating the aqueous composition according to the present exemplary embodiment and drying the coating film (before removal of resin particles) when the polyimide film is produced. From these viewpoints, the glass transition temperature of the resin particles may be, for example, 60° C. or higher, preferably 70° C. or higher, and more preferably 80° C. or higher.

The glass transition temperature is determined from a DSC curve obtained by differential scanning calorimetry (DSC), and more specifically, it is determined by the method of determining the glass transition temperature described in JIS K 7121:1987 "Method for measuring transition temperature of plastic" "extrapolated glass transition onset temperature".

Inorganic Particles

Specific examples of the inorganic particles include silica (silicon dioxide) particles, magnesium oxide particles, alumina particles, zirconia particles, calcium carbonate particles, calcium oxide particles, titanium dioxide particles, zinc oxide particles, and cerium oxide particles.

As described above, the shape of the particles may be, for example, preferably spherical. From this viewpoint, as the inorganic particles, for example, preferred are silica particles, magnesium oxide particles, calcium carbonate particles, and alumina particles, more preferred are silica particles, titanium oxide particles, and alumina particles, and still more preferred are silica particles.

These inorganic particles may be used alone or in combination of two or more kinds thereof.

In a case where the wettability and dispersibility of the inorganic particles in the solvent of the aqueous composition according to the present exemplary embodiment are insufficient, the surfaces of the inorganic particles may be modified as necessary.

Examples of the method of surface modification of the inorganic particles include a method of treating with an alkoxysilane having an organic group represented by a silane coupling agent; a method of coating with an organic acid such as oxalic acid, citric acid, and lactic acid; and the like.

The content of the particles may be determined in accordance with the application of the polyimide film, and is, for example, preferably 0.1% by mass or more and 20% by mass or less, more preferably 0.5% by mass or more and 20% by mass or less, still more preferably 1% by mass or more and 20% by mass or less, with respect to the total mass of the aqueous composition according to the present exemplary embodiment.

In the aqueous composition according to the present exemplary embodiment, the content of the particles is, for example, preferably 10% by mass or more and 120% by mass or less, more preferably 25% by mass or more and 110% by mass or less, still more preferably 30% by mass or more and 100% by mass or less, with respect to the polyimide precursor.

With such a particle content, a porous polyimide film having a high porosity can be easily obtained while maintaining mechanical strength. A porous polyimide film having high mechanical strength and a high porosity is useful as a separator for a secondary battery.

Water-insoluble fibrous organic substance and polyalkylene oxide having a viscosity-average molecular weight of 5 million or more The aqueous composition according to the present exemplary embodiment includes at least one polymer material selected from the group consisting of a water-insoluble fibrous organic substance and a polyalkylene oxide (hereinafter, also referred to simply as high-molecular-weight polyalkylene oxide) having a viscosity-average molecular weight of 5 million or more.

Hereinafter, the water-insoluble fibrous organic substance and the high-molecular-weight polyalkylene oxide are collectively referred to as a specific polymer material.

Water-Insoluble Fibrous Organic Substance

The water-insoluble fibrous organic substance is a water-insoluble organic substance which is an elongated thread-like solid having a wire diameter of 1 nm or more.

The type of fibrous organic substance is not particularly limited, and is, for example, preferably resin fiber, plant fiber, or the like.

Further, the water-insoluble fibrous organic substance means that the dissolve amount of the fibrous organic substance is less than 1 part by mass with respect to 100 parts by mass of water at 25° C.

Examples of the material constituting the water-insoluble fibrous organic substance include plant fibers (specifically, cellulose fibers) and aramid fibers.

The fiber diameter of the water-insoluble fibrous organic substance is preferably 1 nm or more and 500 nm or less, for example, from the viewpoint of preventing the particles from the settling or surfacing.

The fiber length of the water-insoluble fibrous organic substance is preferably 10 nm or more and 10,000 nm or less, for example, from the viewpoint of preventing the particles from the settling or surfacing.

The fiber diameter and fiber length of the water-insoluble fibrous organic substance are measured by the following methods.

The fiber length is determined by measuring the length of 20 fibers using a scanning electron microscope (SEM) and taking the average value. The fiber diameter is the average of the maximum diameter of 20 fibers, measured at one end per fiber.

The water-insoluble fibrous organic substance can be obtained by microfibrillating the raw material water-insoluble fiber.

Here, microfibrillation means a state in which a raw material fiber is torn to microfibrils (microfiber) which are components of the raw material fiber, or a state in which microfibrils in the raw material fiber appear on the surface of the fiber and become fluffy.

An external force such as a mechanical shearing force (for example, a high-pressure homogenizer) is used for the microfibrillation, and the raw material fiber can be miniaturized up to the fiber diameter by the external force.

In other words, it can be said that the water-insoluble fibrous organic substance used in the present exemplary embodiment is a microfibrillated fiber.

The water-insoluble fibrous organic substance used may be a commercially available product.

Commercially available water-insoluble fibrous organic substances include CELISH (microfibrous cellulose) and TIARA (microfibrous aramid) of DaicelMiraizu Co., Ltd., and BiNFi-s (BiNFi-s, a microfibrous cellulose) of Sugino Machine Co., Ltd.

Polyalkylene oxide having a viscosity-average molecular weight of 5 million or more The polyalkylene oxide is a polymer compound containing a structural unit represented by $-(C_mH_{2m}O)_n-$, and is soluble in water. Here, m and n each independently represent an integer of 2 or more.

The m is preferably, for example, 2 or more and 6 or less, more preferably, for example, 2 or more and 3 or less from the viewpoint of availability, or the like, and particularly preferably 2 from the viewpoint of the formability of the network structure, and from the viewpoint of high affinity with the particle surface and ease of inhibiting the movement of particles. That is, the polyalkylene oxide is preferably polyethylene oxide, for example, from the viewpoint of high affinity with the particle surface and ease of inhibiting the movement of particles as compared with the polypropylene oxide.

Further, n may be an integer satisfying the viscosity-average molecular weight of 5 million or more.

The high-molecular-weight polyalkylene oxide is obtained by ring-opening polymerization of cyclic ethers such as ethylene oxide, propylene oxide, and oxetane.

The end of the high-molecular-weight polyalkylene oxide may be modified as long as the effect of preventing the particles from settling or surfacing is not impaired.

The viscosity-average molecular weight of the high-molecular-weight polyalkylene oxide is, for example, preferably 6 million or more and 11 million or less, more preferably 7 million or more and 11 million or less, and still more preferably 8 million or more and 10 million or less from the viewpoints of preventing the particles from settling or surfacing and availability.

The viscosity-average molecular weight of the high-molecular-weight polyalkylene oxide is measured by the following method.

1 g of the measurement sample is uniformly dissolved in 100 cm³ of methylene chloride, and the specific viscosity $\eta sp$ is measured with an Ubbelohde viscousmeter under a measurement environment of 25° C., and the intrinsic viscosity $[\eta]$ (cm³/g) is obtained from the relational expression $\eta sp/c=[\eta]+0.45[\eta]^2 c$ (where c is the concentration [g/cm³]), and the viscosity-average molecular weight is obtained from the following formula (I) given by H. Schnell.

$$[\eta]=1.23\times10^{-4} Mv^{0.83} \quad \text{Formula (I):}$$

The high-molecular-weight polyalkylene oxide used may a commercially available product.

Examples of the commercially available high-molecular-weight polyalkylene oxides include the PEO (registered trademark) series (Specifically, PEO-29, PEO-27, and the like) of Sumitomo Seika Co., Ltd., and the ALKOX series (For example, E-300) of Meisei Chemical Industry Co., Ltd.

In the aqueous composition according to the present exemplary embodiment, the specific polymer material may be used alone or in combination of two or more kinds thereof. Specifically, as the specific polymer material, fibrous organic substances may be used alone or in combination of two or more kinds thereof, high-molecular-weight polyalkylene oxides may be used alone or in combination of two or more kinds thereof, or one or more fibrous organic substances and one or more high-molecular-weight polyalkylene oxides may be used in combination.

The content of the specific polymer material may be, for example, 0.5% by mass or more and 8.0% by mass or less, more preferably 1.0% by mass or more and 3.0% by mass or less, and still more preferably 1.5% by mass or more and 2.0% by mass or less, based on the polyimide precursor.

Since the specific polymer material is a component which is difficult to remove in the coating and drying steps in the production process of the polyimide film, for example, it is preferable to use a small amount.

In the aqueous composition according to the present exemplary embodiment, the content of the specific polymer material may be, for example, 0.05% by mass or more and 15.0% by mass or less, more preferably 0.1% by mass or more and 2.0% by mass or less, and still more preferably 0.2% by mass or more and 1.5% by mass or less, with respect to the particles, from the viewpoint of suppressing the particles from settling or surfacing.

Water

The aqueous composition according to the present exemplary embodiment contains water.

Examples of water include distilled water, ion-exchanged water, deionized water, ultrafiltered water, and pure water.

The water content is, for example, preferably 70% by mass or more, more preferably 75% by mass or more, still more preferably 80% by mass or more, and particularly preferably 85% by mass or more, with respect to the total mass of the aqueous composition according to the present exemplary embodiment.

The upper limit of the water content may be determined according to the application of the polyimide film, and examples thereof include 90% by mass.

In the aqueous composition according to the present exemplary embodiment, the content of water to the water-containing aqueous solvent is, for example, preferably 70% by mass or more, more preferably 80% by mass or more, and still more preferably 85% by mass or more.

Here, the aqueous solvent is a general term for water and a water-soluble organic solvent. Here, water-soluble means that at 25° C., the target substance dissolves in water by 1% by mass or more.

Other Components

The aqueous composition according to the present exemplary embodiment may contain other components, as necessary, in addition to the above-mentioned polyimide precursor, particles, specific polymer material, and water.

Water-Soluble Organic Solvent

Organic Amine Compound

The aqueous composition according to the present exemplary embodiment preferably contains, for example, an organic amine compound as one of the water-soluble organic solvents.

The organic amine compound is a compound which amine-chlorinates the polyimide precursor (its carboxyl group) and enhances the solubility thereof in an aqueous solvent and also functions as an imidization accelerator. Specifically, the organic amine compound may be, for example, an amine compound having a molecular weight of 170 or less. The organic amine compound is a compound other than diamine compound, which is a raw material of the polyimide precursor.

The organic amine compound may be, for example, a water-soluble compound. Water-soluble means that at 25° C., the target substance dissolves in water by 1% by mass or more.

Examples of the organic amine compound include a primary amine compound, a secondary amine compound, and a tertiary amine compound.

Among these, the organic amine compound may be, for example, at least one selected from a secondary amine compound or a tertiary amine compound (particularly, a tertiary amine compound). In a case where a tertiary amine compound or a secondary amine compound is applied as the organic amine compound (particularly, the tertiary amine compound), the solubility of the polyimide precursor in the solvent is easily increased, the film-forming property is easily improved, and the storage stability of the aqueous composition according to the present exemplary embodiment is easily improved.

In addition to monovalent amine compounds, examples of organic amine compounds include divalent or higher polyvalent amine compounds. In a case where a polyvalent amine compound of divalent or higher is applied, a pseudo-crosslinked structure is easily formed between the molecules of the polyimide precursor, and the storage stability of the aqueous composition according to the present exemplary embodiment is easily improved.

Examples of the primary amine compound include methylamine, ethylamine, n-propylamine, isopropylamine, 2-ethanolamine, and 2-amino-2-methyl-1-propanol.

Examples of the secondary amine compound include dimethylamine, 2-(methylamino)ethanol, 2-(ethylamino)ethanol, and morpholine.

Examples of the tertiary amine compound include 2-dimethylaminoethanol, 2-diethylaminoethanol, 2-dimethylaminopropanol, pyridine, triethylamine, picoline, N-methylmorpholine (for example, N-methylmorpholine, N-ethylmorpholine), N-ethylmorpholine, 1,2-dimethylimidazole, 2-ethyl-4-methylimidazole, and N-alkylpiperidine (for example, N-methylpiperidine, N-ethylpiperidine).

Among these, for example, a tertiary amine compound is preferable, N-alkylmorpholine is more preferable, and N-methylmorpholine is particularly preferable.

The organic amine compounds may be used alone or in combination of two or more kinds thereof.

The content of the organic amine compound is, for example, preferably 40% by mass or more and 100% by mass or less, more preferably 45% by mass or more and 90% by mass or less, and still more preferably 50% by mass or more and 80% by mass or less, with respect to the polyimide precursor.

Other Water-Soluble Organic Solvents

The aqueous composition according to the present exemplary embodiment may contain other water-soluble organic solvents (excluding the above-mentioned organic amine compounds), as necessary.

Other water-soluble organic solvents include aprotic polar solvents, water-soluble ether-based solvents, water-soluble ketone-based solvents, water-soluble alcohol-based solvents, and the like.

Examples of the aprotic polar solvent include N-methyl-2-pyrrolidone (NMP), N,N-dimethylformamide (DMF), 1,3-dimethyl-2-imidazolidinone (DMI), N,N-dimethylacetamide (DMAc), N,N-diethylacetamide (DEAc), dimethyl sulfoxide (DMSO), hexamethylene phosphoramide (HMPA), N-methylcaprolactam, N-acetyl-2-pyrrolidone, and 1,3-dimethyl-imidazolidone.

The water-soluble ether-based solvent is a water-soluble solvent having an ether bond in one molecule.

Examples of the water-soluble ether-based solvent include tetrahydrofuran (THF), dioxane, trioxane, 1,2-dimethoxyethane, diethylene glycol dimethyl ether, and diethylene glycol diethyl ether. Among these, the water-soluble ether-based solvent is, for example, preferably tetrahydrofuran or dioxane.

The water-soluble ketone-based solvent is a water-soluble solvent having a ketone group in one molecule.

Examples of the water-soluble ketone-based solvent include acetone, methyl ethyl ketone, and cyclohexanone. Among these, the water-soluble ketone-based solvent is, for example, preferably acetone.

The water-soluble alcohol-based solvent is a water-soluble solvent having an alcoholic hydroxyl group in one molecule.

Examples of the water-soluble alcohol-based solvent include methanol, ethanol, 1-propanol, 2-propanol, tert-butyl alcohol, ethylene glycol, ethylene glycol monoalkyl ether, propylene glycol, propylene glycol monoalkyl ether, diethylene glycol, diethylene glycol monoalkyl ether, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerin, 2-ethyl-2-hydroxymethyl-1,3-propanediol, and 1,2,6-hexanetriol. Among these, preferred as the water-soluble alcohol-based solvent are methanol, ethanol, 2-propanol, ethylene glycol, ethylene glycol monoalkyl ether, propylene glycol, propylene glycol monoalkyl ether, diethylene glycol, and diethylene glycol monoalkyl ether.

The other water-soluble organic solvents may be used alone or in combination of two or more kinds thereof.

The other water-soluble organic solvent may have, for example, a boiling point of 270° C. or lower, preferably 60° C. or higher and 250° C. or lower, and more preferably 80° C. or higher and 230° C. or lower. In a case where the boiling point of the water-soluble organic solvent is set within the above range, the water-soluble organic solvent hardly remains in the polyimide film, and the polyimide film having high mechanical strength is easily obtained.

The content of the aqueous solvent containing water is, for example, preferably 75% by mass or more, more preferably 80% by mass or more, with respect to the total mass of the aqueous composition according to the present exemplary embodiment.

Other Additives

The aqueous composition according to the present exemplary embodiment may contain a catalyst for promoting the imidization reaction, a leveling material for improving the quality of film formation, and the like.

The catalyst for promoting the imidization reaction used may be a dehydrating agent such as an acid anhydride, an acid catalyst such as a phenol derivative, a sulfonic acid derivative, a benzoic acid derivative, or the like.

Further, the aqueous composition according to the present exemplary embodiment may contain, for example, a conductive material (conductive (for example, a volume resistivity of less than $10^7$ Ω·cm) or semiconductive material (for example, a volume resistivity of $10^7$ Ω·cm or more and $10^{13}$ Ω·cm or less)) as a conductive agent to be added for imparting conductivity, depending on the purpose of use of the polyimide film.

Examples of the conductive agent include carbon black (for example, acidic carbon black having a pH of 5.0 or less); metals (for example, aluminum or nickel); metal oxides (for example, yttrium oxide, or tin oxide); ion conductive materials (for example, potassium titanate, or LiCl); and the like.

These conductive agents may be used alone or in combination of two or more.

Further, the aqueous composition according to the present exemplary embodiment may contain $LiCoO_2$, $LiMn_2O$, and the like used as electrodes of a lithium ion battery.

Physical Properties

The aqueous composition according to the present exemplary embodiment preferably has, for example, a viscosity at 25° C. of 1 Pa·s or more and 200 Pa·s or less, and more preferably 5 Pa·s or more and 180 Pa·s or less.

The aqueous composition according to the present exemplary embodiment can prevent the particles from settling or surfacing even in a case where the aqueous composition has the above-mentioned viscosity.

The viscosity of the aqueous composition according to the present exemplary embodiment at 25° C. is measured using an E-type viscometer (for example, TVE-22H, Toki Sangyo Co., Ltd.).

From the viewpoint of achieving the viscosity at 25° C., the aqueous composition according to the present exemplary embodiment preferably has, for example, a total solid content of 1% by mass or more and 35% by mass or less, more preferably 3% by mass or more and 30% by mass or less, and still more preferably 5% by mass or more and 25% by mass or less, with respect to the total mass of the aqueous composition according to the present exemplary embodiment.

Method for Producing Polyimide Film and Method for Producing Porous Polyimide Film A method for producing a polyimide film according to the present exemplary embodiment includes: a step of applying the aqueous composition according to the present exemplary embodiment on a substrate to form a coating film (also referred to as first step); a step of drying the coating film to form a film containing a specific polymer material, a polyimide precursor, and particles (also referred to as second step); and a step of imidizing the polyimide precursor contained in the film to form a polyimide film (also referred to as third step).

A method for producing a porous polyimide film according to the present exemplary embodiment includes: a step of applying the aqueous composition according to the present exemplary embodiment on a substrate to form a coating film (first step); a step of drying the coating film to form a film containing a specific polymer material, a polyimide precursor, and particles (second step); a step of imidizing the polyimide precursor contained in the film to form a polyimide film (third step); and a step of removing particles from the film or the polyimide film (also referred to as fourth step).

Since the above-mentioned first step, second step, and third step are common steps, the steps will be described below.

Hereinafter, an example of a method for producing a porous polyimide film according to the present exemplary embodiment will be described with reference to the drawings.

FIG. 1 is a schematic view showing a structure of a porous polyimide film obtained by the method for producing a porous polyimide film according to the present exemplary embodiment.

In the reference numerals in FIG. 1, 31 represents a substrate, 51 represents a release layer, 10A represents pores, and 10 represents a porous polyimide film.

First Step

In the first step, the aqueous composition according to the present exemplary embodiment described above (that is, an aqueous composition containing a specific polymer material, a polyimide precursor, particles, and water) is applied onto a substrate to form a coating film.

Method for Preparing Aqueous Composition

In the first step, first, the aqueous composition according to the present exemplary embodiment is prepared. Hereinafter, the first step will be described as an example in a case where a high-molecular-weight polyalkylene oxide is used as the specific polymer material, but the same method may also be used in a case where a water-insoluble fibrous organic substance is used as the specific polymer material.

The method for preparing the aqueous composition used in the first step (that is, the aqueous composition according to the present exemplary embodiment) is not particularly limited.

First, a high-molecular-weight polyalkylene oxide-containing liquid is prepared by dispersing or dissolving the high-molecular-weight polyalkylene oxide in an aqueous solvent.

The aqueous composition is prepared by polymerizing a tetracarboxylic dianhydride and a diamine compound in a dispersion of particles to form a resin (polyimide precursor), and then adding the high-molecular-weight polyalkylene oxide-containing liquid thereto.

Further, in a case where the particles are resin particles, the resin particles may be granulated in an aqueous solvent to obtain the dispersion.

Specific examples of the method for preparing the aqueous composition include the following methods.

First, a high-molecular-weight polyalkylene oxide-containing liquid is obtained by dispersing or dissolving the high-molecular-weight polyalkylene oxide in an aqueous solvent. Separately, resin particles are granulated in an aqueous solvent to obtain a resin particle dispersion. Subsequently, in the resin particle dispersion, in the presence of an organic amine compound, a tetracarboxylic dianhydride and a diamine compound are polymerized to generate a resin (polyimide precursor), and a high-molecular-weight polyalkylene oxide-containing liquid is added thereto to obtain a mixed liquid. A high-molecular-weight polyalkylene oxide-containing liquid is added to the obtained mixed liquid to prepare an aqueous composition.

Another example of a method for preparing an aqueous composition includes a method for preparing an aqueous composition by adding a high-molecular-weight polyalkylene oxide-containing liquid to a dispersion in which particles are dispersed to prepare a mixed liquid, and synthesizing a polyimide precursor in the mixed liquid, a method for mixing a solution in which the polyimide precursor is dissolved in an aqueous solvent, resin particles in a dry state, and the high-molecular-weight polyalkylene oxide-containing liquid, and a method for mixing a solution in which the polyimide precursor is dissolved in an aqueous solvent, a dispersion in which the resin particles are dispersed in advance in an aqueous solvent, and the high-molecular-weight polyalkylene oxide-containing liquid.

In preparing the aqueous composition, a polyimide precursor containing solution obtained by polymerizing a tetracarboxylic dianhydride and a diamine compound in an organic solvent such as an aprotic polar solvent (for example, N-methylpyrrolidone (NMP)) to generate a resin (polyimide precursor), and then introducing this mixture into an aqueous solvent to precipitate the resin (polyimide precursor) may be used.

Application of Polyimide Precursor Solution

In the first step, the aqueous composition obtained by the method described above is applied onto a substrate to form a coating film. The obtained coating film contains a specific polymer material, a polyimide precursor, particles, and an aqueous solvent. Then, the particles in the coating film are distributed in a state where aggregation is suppressed.

The substrate to which the aqueous composition is applied (the substrate 31 in FIG. 1) is not particularly limited.

Examples of the substrate include resin substrates such as polystyrene and polyethylene terephthalate; glass substrates; ceramic substrates; metal substrates such as iron and stainless steel (SUS); and composite material substrates in which these materials are combined.

Further, as necessary, the substrate may be provided with a release layer (release layer 51 in FIG. 1) by performing a release treatment with, for example, a silicone-based or fluorine-based release agent. It is also effective to roughen the surface of the base material to a size of about the particle size of the particles to promote the exposure of the particles on the base material contact surface.

The method for applying the aqueous composition on the substrate is not particularly limited, and examples thereof include various methods such as a spray coating method, a spin coating method, a roll coating method, a bar coating method, a slit die coating method, and an inkjet coating method.

Second Step

In the second step, the coating film obtained in the first step is dried to form a film containing the specific polymer material, the polyimide precursor, and the particles.

The method for drying the coating film formed on the substrate is not particularly limited, and examples thereof include various methods such as heat drying, natural drying, and vacuum drying.

More specifically, the film is preferably, for example, formed by drying the coating film so that the solvent remaining in the film is 50% or less (for example, preferably 30% or less), with respect to the solid content of the film.

In the second step, a treatment for exposing the particles may be performed in the process of drying to form a film. By performing the treatment for exposing the particles, the aperture ratio of the porous polyimide film can be increased.

Specific examples of the treatment for exposing the particles include the methods shown below.

In the process of drying the coating film to form a coating film containing the specific polymer material, the polyimide precursor, and the particles, the polyimide precursor in the formed coating film is in a state capable of being dissolved in water as described above. Therefore, particles can be exposed from the film by, for example, a treatment of wiping the film with water or a treatment of immersing the film in water. More specifically, for example, by performing the treatment of wiping the surface of the film with water to expose the particles, the polyimide precursor (and solvents) coated with the particles is removed. As a result, particles are exposed on the surface of the treated film.

In particular, in a case where a film in which particles are buried is formed, it is preferable to employ, for example, the above treatment as a treatment for exposing particles buried in the film.

Third Step

In the third step, the polyimide precursor contained in the film obtained in the second step is imidized to form a polyimide film.

In the third step, specifically, the polyimide film is formed by heating the film obtained in the second step and advancing imidization.

As the imidization progresses and the imidization rate increases, the polyimide film becomes difficult to dissolve in an organic solvent.

Imidization

In the third step, for heating to imidize the polyimide precursor in the film, for example, heating in two or more stages is used.

For example, in a case where the particles are resin particles and are heated in two stages, specifically, the following heating conditions are adopted.

As the heating condition of the first stage, for example, it is desirable that the temperature is such that the shape of the resin particles is maintained. Specifically, for example, the temperature may be in the range of 50° C. or higher and 150° C. or lower, preferably in the range of 60° C. or higher and 140° C. or lower. The heating time is, for example, preferably in the range of 10 minutes or more and 60 minutes or less. The higher the heating temperature, the shorter the heating time, which is preferable, for example.

Examples of the heating conditions of the second stage include heating at 150° C. or higher and 450° C. or lower (preferably 200° C. or higher and 400° C. or lower) for 20 minutes or longer and 120 minutes or shorter. By setting the heating conditions in this range, the imidization reaction further proceeds. During the heating reaction, the temperature is, for example, preferably increased in stages or gradually at a constant rate before the final temperature of heating is reached.

The heating conditions are not limited to the above two-stage heating method, and for example, a one-stage heating method may be adopted. In the case of the one-stage heating method, for example, the imidization may be completed only by the heating conditions shown in the above second stage.

Fourth Step

In the fourth step, particles are removed from the film obtained in the second step or the polyimide film obtained in the third step. By going through the fourth step, the particle portion becomes a pore (pore 10A in FIG. 1), and a porous polyimide film (porous polyimide film 10 in FIG. 1) is obtained. In the fourth step, specifically, the particles may be removed in the process of heating the film to imidize the polyimide precursor with respect to the film obtained in the second step, or may be removed from the polyimide film after imidization is completed (after imidization) in the third step.

Examples of the method of removing the particles from the film include a method of decomposing and removing the particles (preferably, resin particles) by heating, a method of removing the particles by dissolving the particles with an organic solvent, and a method of removing the resin particles by decomposition with a laser or the like.

In the case of using the method of decomposing and removing the particles by heating, the method may also serve as the third step described above. That is, the particles may be removed by heating in the third step.

These methods may be performed by only one method or may be used in combination of two or more methods.

In the case of the method of decomposing and removing the resin particles by heating in the fourth step, for example, it is preferable to heat at a temperature equal to or higher than the melting temperature of the resin particles.

The resin particles can be removed under the heating conditions of imidization in the third step.

In the case of using the method for removing the resin particles by dissolving them in an organic solvent, specific examples thereof include a method of removing the resin particles by dissolving them in an organic solvent by bringing a film or a polyimide film into contact with the organic solvent.

Examples of the method for bringing the film or the polyimide film into contact with the organic solvent include a method for immersing the coating film or the polyimide film in the organic solvent, a method for applying the organic solvent to the film or the polyimide film, and a method for bringing the film or the polyimide film into contact with the organic solvent vapor.

The organic solvent used for dissolving the resin particles is not particularly limited as long as the organic solvent does not dissolve the polyimide precursor and the polyimide and can dissolve the resin particles.

In a case where the particles are resin particles, the organic solvent used may be, for example, ethers such as tetrahydrofuran and 1,4-dioxane; aromatic compounds such as benzene and toluene; ketones such as acetone; and esters such as ethyl acetate.

Among these, for example, preferred are ethers such as tetrahydrofuran and 1,4-dioxane or aromatic compounds such as benzene and toluene; and more preferred is tetrahydrofuran or toluene.

In the case of using the method of dissolving and removing the particles with an organic solvent, for example, the method is preferably performed, for example, when the imidization rate of the polyimide precursor in the film is 10% or more from the viewpoint of the removability of particles and the prevention of the film itself from dissolving in the organic solvent.

Examples of the method for setting the imidization rate to 10% or more include the heating conditions of the first stage in the third step.

That is, for example, it is preferable to remove the particles in the film by dissolving them with an organic solvent after performing the heating in the first stage in the third step.

Here, the imidization rate of the polyimide precursor will be described.

Examples of the partially imidized polyimide precursor include precursors having a structure having a repeating unit represented by the following general formula (I-1), the following general formula (I-2), or the following general formula (I-3).

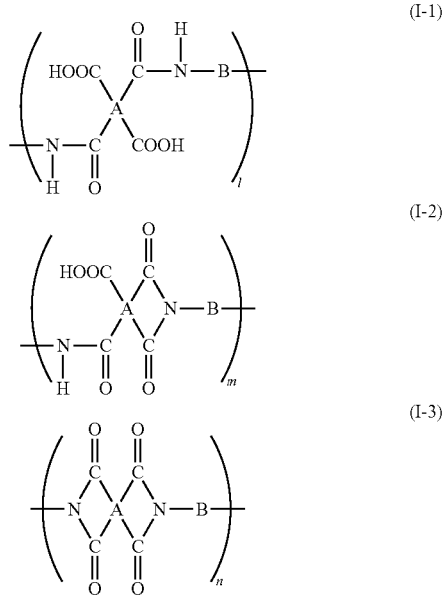

In the general formula (I-1), the general formula (I-2), and the general formula (I-3), A represents a tetravalent organic group and B represents a divalent organic group. l represents an integer of 1 or more, and m and n each independently represent 0 or an integer of 1 or more.

Note that A and B are synonymous with A and B in the general formula (I) described later.

The imidization rate of the polyimide precursor represents the ratio of the number of bonds closed (2n+m) to the total number of bonds (2l+2m+2n) in the bonds of the polyimide precursor (reaction portion of tetracarboxylic dianhydride and diamine compound). That is, the imidization rate of the polyimide precursor is represented by "(2n+m)/(2l+2m+2n)".

The imidization rate (value of "(2n+m)/(2l+2m+2n)") of the polyimide precursor is measured by the following method.

Measurement of Imidization Rate of Polyimide Precursor

Preparation of Polyimide Precursor Sample (i) The polyimide precursor solution to be measured is applied onto a silicon wafer in a film thickness range of 1 μm or more and 10 μm or less to prepare a coating film sample.

(ii) The coating film sample is immersed in tetrahydrofuran (THF) for 20 minutes to replace the solvent in the coating film sample with tetrahydrofuran (THF). The solvent to be immersed is not limited to THF, and can be selected from a solvent that does not dissolve the polyimide precursor and can be miscible with the solvent component contained in the polyimide precursor solution. Specifically, alcohol solvents such as methanol and ethanol, and ether compounds such as dioxane can be used.

(iii) The coating film sample is taken out from the THF, and $N_2$ gas is blown to the THF adhered to the surface of the coating film sample to remove the sample. Under a reduced pressure of 10 mmHg or less, the coating film sample is dried for 12 hours or more in the range of 5° C. or more and 25° C. or less to prepare a polyimide precursor sample.

Preparation of 100% Imidized Standard Sample (iv) In the same manner as in (i) above, the polyimide precursor solution to be measured is applied onto a silicon wafer to prepare a coating film sample.

(v) The coating film sample is heated at 380° C. for 60 minutes to perform an imidization reaction to prepare a 100% imidized standard sample.

Measurement and Analysis (vi) Using a Fourier transform infrared spectrophotometer (FT-730 manufactured by Horiba Seisakusho), the infrared absorption spectra of the 100% imidized standard sample and the polyimide precursor sample are measured. The ratio I'(100) of the absorption peak derived from the imide bond near 1780 cm$^{-1}$ (Ab'(1780 cm$^{-1}$)) to the absorption peak derived from the aromatic ring near 1500 cm (Ab'(1500 cm$^{-1}$)) of the 100% imidized standard sample is determined.

(vii) Similarly, the polyimide precursor sample is measured, and the ratio I(x) of the absorption peak derived from the imide bond near 1780 cm$^{-1}$ (Ab(1780 cm$^{-1}$)) to the absorption peak derived from the aromatic ring near 1500 cm$^{-1}$ (Ab(1500 cm$^{-1}$)) of the 100% imidized standard sample is determined.

Then, the measured absorption peaks I'(100) and I(x) are used to calculate the imidization rate of the polyimide precursor based on the following formula.

Formula: imidization rate of polyimide precursor=$I(x)/I'(100)$

Formula: $I'(100)=(Ab'(1780\ cm^{-1}))/(Ab'(1500\ cm^{-1}))$

Formula: $I(x)=(Ab(1780\ cm^{-1}))/(Ab(1500\ cm^{-1}))$

The measurement of the imidization rate of this polyimide precursor is applied to the measurement of the imidization rate of the aromatic polyimide precursor. In the case of measuring the imidization rate of the aliphatic polyimide precursor, a peak derived from a structure that does not change before and after the imidization reaction is used as an internal standard peak instead of the absorption peak of the aromatic ring.

The substrate used in the first step may be peeled from the film after the second step, may be peeled from the polyimide film after the third step, or may be peeled from the porous polyimide film obtained after the fourth step.

Thus, the polyimide film or the porous polyimide film is produced.

Average Film Thickness of Polyimide Film or Porous Polyimide Film

The average film thickness of the polyimide film or the porous polyimide film produced by using the aqueous composition according to the present exemplary embodiment is not particularly limited and is selected depending on the applications.

For example, the average film thickness of the porous polyimide film may be, for example, 10 μm or more and 1000 μm or less. The average film thickness of the polyimide film or the porous polyimide film may be 20 μm or more, 30 μm or more, and the average film thickness of the polyimide film or the porous polyimide film may be 500 μm or less, or 400 μm or less.

In the case of the above film thickness, for example, it is appropriate for a separator for a secondary battery described later.

The average film thickness of the polyimide film or the porous polyimide film in the present exemplary embodiment is calculated by the arithmetic average of the five points of the film thickness of the polyimide film measured using an eddy current thickness meter CTR-1500E manufactured by Sanko Electronics.

Applications of Porous Polyimide Film

The porous polyimide film produced by using the aqueous composition according to the present exemplary embodiment may be applied to, for example, a filter application, a secondary battery application, or the like.

In particular, the above-mentioned porous polyimide film is appropriate as a separator for a lithium ion secondary battery, for example.

Lithium Ion Secondary Battery

A lithium ion secondary battery provided with the porous polyimide film produced by using the aqueous composition according to the present exemplary embodiment as a separator for a lithium ion secondary battery will be described with reference to FIG. 2.

Figure 2:
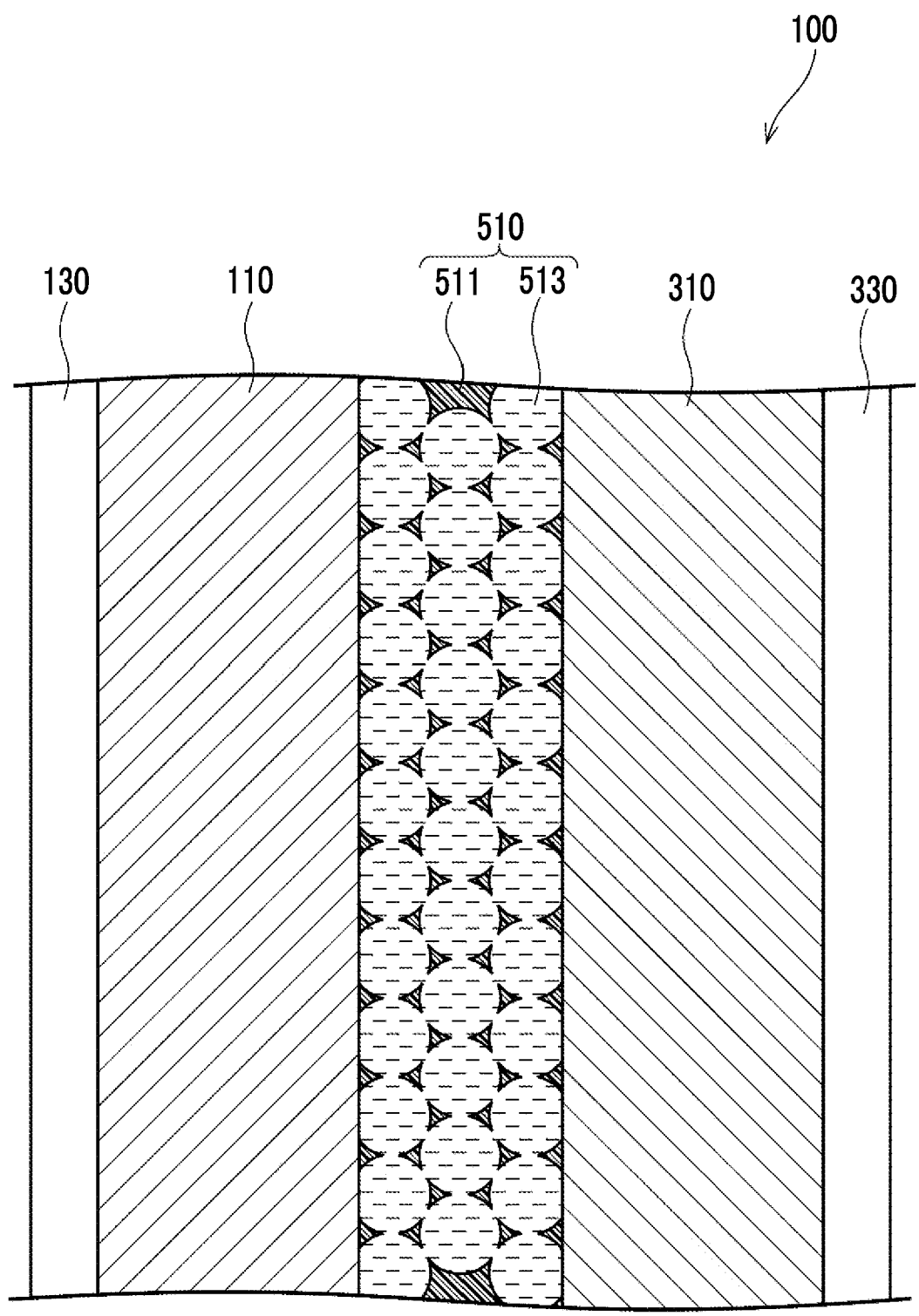
FIG. 2 is a schematic partial cross-sectional view showing an example of a lithium ion secondary battery provided with the porous polyimide film produced by using the polyimide precursor-containing aqueous composition according to the present exemplary embodiment as a separator for a lithium ion secondary battery.

FIG. 2 is a schematic partial cross-sectional view showing an example of a lithium ion secondary battery to which a separator for a lithium ion secondary battery is applied.

As shown in FIG. 2, the lithium ion secondary battery 100 includes a positive electrode active material layer 110, a separator layer 510, and a negative electrode active material layer 310 housed inside an exterior member (not shown). The positive electrode active material layer 110 is provided on a positive electrode current collector 130, and the negative electrode active material layer 310 is provided on a negative electrode current collector 330. The separator layer 510 is provided so as to separate the positive electrode active material layer 110 from the negative electrode active material layer 310, and is arranged between the positive electrode active material layer 110 and the negative electrode active material layer 310 so that the positive electrode active material layer 110 and the negative electrode active material layer 310 are opposed to each other. The separator layer 510 includes a separator 511 and an electrolytic solution 513 filled inside the pores of the separator 511. A porous polyimide film produced by using the aqueous composition according to the present exemplary embodiment is applied to the separator 511. The positive electrode current collector 130 and the negative electrode current collector 330 are members provided as needed.

Positive Electrode Current Collector 130 and Negative Electrode Current Collector 330

The material used for the positive electrode current collector 130 and the negative electrode current collector 330 is not particularly limited, and any known conductive material may be used. For example, metals such as aluminum, copper, nickel and titanium can be used.

Positive Electrode Active Material Layer 110

The positive electrode active material layer 110 is a layer containing a positive electrode active material. The positive electrode active material layer may contain known additives such as a conductive auxiliary agent and a binder resin as necessary. The positive electrode active material is not particularly limited, and a known positive electrode active material is used. Examples thereof include lithium-containing composite oxides ($LiCoO_2$, $LiNiO_2$, $LiMnO_2$, $LiMn_2O_4$, $LiFeMnO_4$, $LiV_2O_5$, etc.), lithium-containing phosphates ($LiFePO_4$, $LiCoPO_4$, $LiMnPO_4$, and $LiNiPO_4$, etc.), and conductive polymers (polyacetylene, polyaniline, polypyrrole, polythiophene, etc.). The positive electrode active materials may be used alone or in combination of two or more kinds thereof.

Negative Electrode Active Material Layer 310

The negative electrode active material layer 310 is a layer containing a negative electrode active material. The negative electrode active material layer may contain known additives such as a binder resin as necessary. The negative electrode active material is not particularly limited, and a known positive electrode active material is used. Examples thereof include carbon materials (graphite (natural graphite, artificial graphite), carbon nanotubes, graphitized carbon, low temperature calcined carbon, etc.), metals (aluminum, silicon, zirconium, titanium, etc.), and metal oxides (tin dioxide, lithium titanate, etc.). The negative electrode active materials may be used alone or in combination of two or more kinds thereof.

Electrolytic Solution 513

Examples of the electrolytic solution 513 include a non-aqueous electrolyte solution containing an electrolyte and a non-aqueous solvent.

Examples of the electrolyte include lithium salt electrolytes ($LiPF_6$, $LiBF_4$, $LiSbF_6$, $LiAsF_6$, $LiClO_4$, $LiN(FSO_2)_2$, $LiN(CF_3SO_2)_2$, $LiN(C_2F_5SO_2)$, $LiC(CF_3SO_2)_3$, etc.). The electrolytes may be used alone or in combination of two or more kinds thereof.

Examples of the non-aqueous solvent include cyclic carbonate (ethylene carbonate, propylene carbonate, butylene carbonate, etc.) and chain carbonate (diethyl carbonate, dimethyl carbonate, ethylmethyl carbonate, methyl acetate, ethyl acetate, methyl propionate, ethyl propionate, γ-butyrolactone, 1,2-dimethoxyethane, 1,2-diethoxyethane, etc.). The non-aqueous solvent may be used alone or in combination of two or more kinds thereof.

Method for Producing Lithium Ion Secondary Battery 100

An example of a method for producing the lithium ion secondary battery 100 will be described.

The coating solution for forming the positive electrode active material layer 110 containing the positive electrode active material is applied to and dried on the positive electrode current collector 130 to obtain the positive electrode having the positive electrode active material layer 110 provided on the positive electrode current collector 130.

Similarly, a coating solution for forming the negative electrode active material layer 310 containing a negative electrode active material is applied and dried to the negative electrode current collector 330 to obtain the negative electrode having the negative electrode active material layer 330 provided on the negative electrode current collector 310. The positive electrode and the negative electrode may be compressed, as necessary.

Next, in such a manner that the positive electrode active material layer 110 of the positive electrode and the negative electrode active material layer 310 of the negative electrode are opposed to each other, a separator 511 is arranged between the positive electrode active material layer 110 and the negative electrode active material layer 310 of the negative electrode to obtain a laminated structure. In the laminated body structure, the positive electrode (positive electrode current collector 130, positive electrode active material layer 110), the separator layer 510, and the negative electrode (negative electrode active material layer 310, negative electrode current collector 330) are laminated in this order. At this time, compression processing may be performed as necessary.

Next, after housing the laminated structure in the exterior member, the electrolytic solution 513 is injected into the inside of the laminated structure. The injected electrolytic solution 513 also penetrates into the pores of the separator 511.

In this way, the lithium ion secondary battery 100 is obtained.

All-Solid-State Battery

Next, an all-solid-state battery to which a porous polyimide film produced by using the aqueous composition according to the present exemplary embodiment is applied will be described. Hereinafter, description will be made with reference to FIG. 3.

Figure 3:
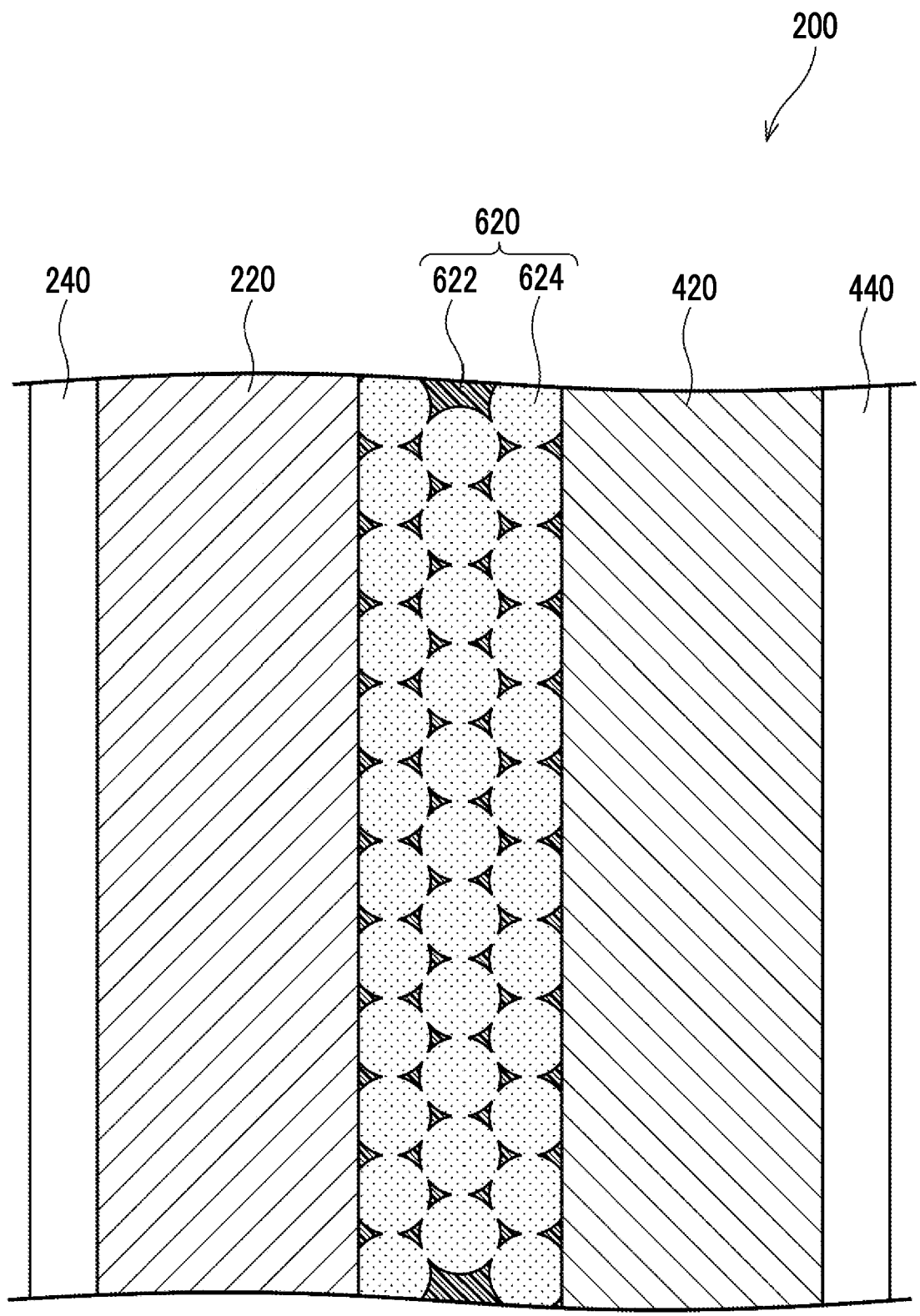
FIG. 3 is a schematic partial cross-sectional view showing an example of an all-solid-state battery provided with the porous polyimide film produced by using the polyimide precursor-containing aqueous composition according to the present exemplary embodiment.

FIG. 3 is a schematic partial cross-sectional view showing an example of the all-solid-state battery according to the present exemplary embodiment. As shown in FIG. 3, the all-solid-state battery 200 includes a positive electrode active material layer 220, a solid electrolyte layer 620, and a negative electrode active material layer 420 housed inside an exterior member (not shown). The positive electrode active material layer 220 is provided on a positive electrode current collector 240, and the negative electrode active material layer 420 is provided on a negative electrode current collector 440. The solid electrolyte layer 620 is arranged between the positive electrode active material layer 220 and the negative electrode active material layer 420 so that the positive electrode active material layer 220 and the negative electrode active material layer 420 are opposed to each other. The solid electrolyte layer 620 includes a solid electrolyte 624 and a holder 622 that holds the solid electrolyte 624, and the solid electrolyte 624 is filled inside the pores of the holder 622. A porous polyimide film produced by using the aqueous composition according to the present exemplary embodiment is applied to the holder 622 that holds the solid electrolyte 624. The positive electrode current collector 240 and the negative electrode current collector 440 are members provided as needed.

Positive Electrode Current Collector 240 and Negative Electrode Current Collector 440

Examples of the material used for the positive electrode current collector 240 and the negative electrode current collector 440 include the same materials as those described in the above-mentioned lithium ion secondary battery.

Positive Electrode Active Material Layer 220 and Negative Electrode Active Material Layer 420

Examples of the material used for the positive electrode active material layer 220 and the negative electrode active material layer 420 include the same materials as those described in the above-mentioned lithium ion secondary battery.

Solid Electrolyte 624

The solid electrolyte 624 is not particularly limited, and examples thereof include known solid electrolytes. Examples include polymer solid electrolytes, oxide solid electrolytes, sulfide solid electrolytes, halide solid electrolytes, and nitride solid electrolytes.

Examples of the polymer solid electrolyte include fluororesins (homopolymers such as polyvinylidene fluoride, polyhexafluoropropylene, and polytetrafluoroethylene, and copolymers having these as structural units), polyethylene oxide resins, polyacrylonitrile resins, and polyacrylate resins. For example, it is preferable to contain a sulfide solid electrolyte in terms of excellent lithium ion conductivity. In the same respect, it is preferable to contain sulfide solid electrolytes containing sulfur and at least one of lithium or phosphorus as constituent elements.

Examples of the oxide solid electrolyte include oxide solid electrolyte particles containing lithium. Examples thereof include $Li_2O$—$B_2O_3$—$P_2O_5$ and $Li_2O$—$SiO_2$.

Examples of the sulfide solid electrolyte include sulfide solid electrolytes containing sulfur and at least one of lithium or phosphorus as constituent elements. Examples thereof include $8Li_2O·67Li_2S·25P_2S_5$, $Li_2S$, $P_2S_5$, $Li_2S$—$SiS_2$, $LiI$—$Li_2S$—$SiS_2$, $LiI$—$Li_2S$—$P_2S_5$, $LiI$—$Li_3PO_4$—$P_2S_5$, $LiI$—$Li_2S$—$P_2O_5$, and $LiI$—$Li_2S$—$B_2S_3$.

Examples of the halide solid electrolyte include $LiI$.

Examples of the nitride solid electrolyte include $Li_3N$.

Method for Producing of all-Solid-State Battery 200

An example of a method for producing the all-solid-state battery 200 will be described.

The coating solution for forming the positive electrode active material layer 220 containing the positive electrode active material is applied to and dried on the positive electrode current collector 240 to obtain the positive electrode having the positive electrode active material layer 220 provided on the positive electrode current collector 240.

Similarly, a coating solution for forming the negative electrode active material layer 420 containing a negative electrode active material is applied and dried to the negative electrode current collector 440 to obtain the negative electrode having the negative electrode active material layer 440 provided on the negative electrode current collector 420.

The positive electrode and the negative electrode may be compressed, as necessary.

Next, a coating solution containing the solid electrolyte 624 for forming the solid electrolyte layer 620 is applied onto the base material and dried to form a layered solid electrolyte.

Next, on the positive electrode active material layer 220 of the positive electrode, as a material for forming the solid electrolyte layer 620, a polyimide film (Porous Polyimide film produced using the aqueous composition according to the present exemplary embodiment) as a holder 622 and a layered solid electrolyte 624 are superposed. Further, the negative electrode is superposed on the material for forming the solid electrolyte layer 620 so that the negative electrode active material layer 420 of the negative electrode is on the side of the positive electrode active material layer 220 to form a laminated structure. In the laminated body structure, the positive electrode (positive electrode current collector 240, positive electrode active material layer 220), the solid electrolyte layer 620, and the negative electrode (negative electrode active material layer 420, negative electrode current collector 440) are laminated in this order.

Next, the laminated structure is subjected to compression processing to impregnate the pores of the polyimide film serving as the holder 622 with the solid electrolyte 624 to hold the solid electrolyte 624.

Next, the laminated structure is housed in the exterior member.

In this way, the all-solid-state battery 200 is obtained.

EXAMPLES

Examples will be described below, but the present invention is not limited to these examples. In the following description, all "parts" and "%" are based on mass unless otherwise specified.

Preparation of Resin Particle Dispersion

Resin Particle Dispersion (B1)

180 parts by mass of styrene, 1 parts by mass of the surfactant Dowfax2A1 (47% solution, manufactured by Dow Chemical), and 120 parts by mass of deionized water are mixed, and the mixture is stirred and emulsified at 1,500 revolutions for 30 minutes by a dissolver to prepare a monomer emulsion. Subsequently, 0.2 parts by mass of Dowfax2A1 (47% solution, manufactured by Dow Chemical Co., Ltd.) and 300 parts by mass of deionized water are charged into the reaction vessel. After heating to 75° C.

under a nitrogen stream, 10 parts by mass of the monomer emulsion is added. Thereafter, a polymerization initiator solution in which 2.0 parts by mass of ammonium persulfate is dissolved in 12 parts by mass of deionized water is added dropwise over 10 minutes. After the reaction is carried out for 180 minutes after the dropping, the remaining monomer emulsion is added dropwise over 180 minutes, and the reaction is further carried out for 50 minutes and then cooled to obtain a resin particle dispersion (B1). The solid content concentration of the resin particle dispersion (B1) is 30.0% by mass. In addition, the average particle size of the resin particles is 0.38 μm.

Resin Particle Dispersion (B2)

A resin particle dispersion (B2) is obtained in the same manner as the resin particle dispersion (B1) except that styrene is replaced with methyl methacrylate. The solid content concentration of the resin particle dispersion (B2) is 36.0% by mass. The average particle size of the resin is 0.37 μm.

Preparation of Polyalkylene Oxide-Containing Liquid

Polyalkylene Oxide-Containing Liquid (C1)

A high-molecular-weight polyalkylene oxide (Grades: PEO-29, polyethylene oxide with a viscosity-average molecular weight of 800 million to 1000 million, Sumitomo Seika Co., Ltd.) is added to deionized water to obtain a high-molecular-weight polyalkylene oxide-containing liquid (C1) having a solid content concentration of 0.5% by mass.

Polyalkylene Oxide-Containing Liquid (C2)

A high-molecular-weight polyalkylene oxide (Grades: PEO-27, polyethylene oxide with a viscosity-average molecular weight of 6 million to 8 million, Sumitomo Seika Co., Ltd.) is added to deionized water to obtain a high-molecular-weight polyalkylene oxide-containing liquid (C2) having a solid content concentration of 0.5% by mass.

Polyalkylene Oxide-Containing Liquid (C3)

A high-molecular-weight polyalkylene oxide (Grades: PEO-18, polyethylene oxide with a viscosity-average molecular weight of 4.30 million to 4.80 million, Sumitomo Seika Co., Ltd.) is added to deionized water to obtain a high-molecular-weight polyalkylene oxide-containing liquid (C3) having a solid content concentration of 0.5% by mass.

Preparation of Carboxymethyl Cellulose-Containing Liquid

Carboxymethyl Cellulose-Containing Liquid (C4)

Carboxymethyl cellulose (product number: 1160, also referred to as Daicel Fine Chem Ltd., also referred to as "CMC") is added to deionized water to obtain a carboxymethyl cellulose-containing liquid (C4) having a solid content concentration of 0.5% by mass.

Preparation of Water-Insoluble Fibrous Organic Substance-Containing Liquid

Water-Insoluble Fibrous Organic Substance-Containing Liquid (C5)

Microfibrous aramid (trade name: TIARA, product number: KY400S, Daicel Miraizu Co., Ltd., fiber diameter 30 nm, fiber length 3,000 nm) is added to deionized water to obtain a water-insoluble fibrous organic substance-containing liquid (C5) having a solid content concentration of 0.5% by mass.

Water-Insoluble Fibrous Organic Substance-Containing Liquid (C6)

Microfibrous cellulose (trade name: CELISH, product number: KY100G, Daicel Miraizu Co., Ltd., fiber diameter 20 nm, fiber length 3,000 nm) is added to deionized water to obtain a water-insoluble fibrous organic substance-containing liquid (C6) having a solid content concentration of 0.5% by mass.

Example A1

Preparation of Polyimide Precursor-Containing Aqueous Composition (PAA-1)

In 170 g of resin particle dispersion (B1), 28 g (96 mmol) of 3,3',4,4'-biphenyltetracarboxylic dianhydride (BPDA), 10 g (96 mmol) of p-phenylenediamine (PDA), and 360 g of ion-exchanged water are added, and the mixture is stirred at 20° C. for 10 minutes.

Next, 20 g (211 mmol) of N-methylmorpholine (organic amine compound) is slowly added, and the mixture is dissolved and reacted by stirring for 24 hours while maintaining the reaction temperature at 60° C. to form a polyimide precursor (A1) composed of BPDA and PDA, and 150 g of a polyalkylene oxide-containing liquid (C1) is added slowly thereto to obtain a polyimide precursor-containing aqueous composition (PAA-1).

The obtained polyimide precursor-containing aqueous composition (PAA-1) has a polyimide precursor content of 5.1% by mass, a resin particle content of 6.8% by mass, a high-molecular-weight polyalkylene oxide content of 0.1% by mass, and a water content of 85.1% by mass, with respect on the total mass thereof.

The viscosity of the polyimide precursor-containing aqueous composition (PAA-1) at 25° C. is 150 Pa·s as measured by the method described above.

Examples A2 to A9, Comparative Examples 1 and 2

Except that the type and amount of the resin particle dispersion and the polyalkylene oxide-containing liquid are appropriately changed to obtain the content of each component as shown in Table 1, polyimide precursor-containing aqueous compositions (PAA-2) to (PAA-11) are obtained in the same manner as in Example A1.

In Comparative Example 2, a carboxymethyl cellulose-containing liquid is used instead of the polyalkylene oxide-containing liquid.

Examples B1 to B9

Except that the type and amount of the resin particle dispersion are appropriately changed and the water-insoluble fibrous organic substance-containing liquid is used instead of the polyalkylene oxide-containing liquid to obtain the content of each component as shown in Table 1, polyimide precursor-containing aqueous compositions (PAA-12) to (PAA-20) are obtained in the same manner as in Example A1.

Evaluation

A porous polyimide film is produced using the polyimide precursor-containing aqueous composition obtained in each Example.

Production Method of Porous Polyimide Film

First, an aluminum plate is prepared as a base material. The aluminum plate is provided with a release layer formed by applying a solution of a release agent KS-700 (manufactured by Shin-Etsu Chemical Co., Ltd.) dissolved in toluene so as to have a thickness of about 0.05 μm after drying and heat-treating at 400° C.

Next, the polyimide precursor-containing aqueous composition obtained in each Example is applied onto the release layer of the aluminum substrate so as to form a coating film having a film thickness of 30 μm after drying, and dried at 90° C. for 1 hour. Thereafter, the temperature is raised from room temperature (25° C., the same applies hereinafter) to 390° C. at a rate of 10° C./min, held at 390° C. for 1 hour, and then cooled to room temperature to obtain a porous polyimide film having a film thickness of about 30 μm.

Since the polyimide precursor-containing aqueous composition (PAA-11) containing carboxymethyl cellulose of Comparative Example 2 has a high viscosity, the applicability at the time of application as described above is deteriorated. As a result, a coating film having a large variation in film thickness is formed.

Confirmation of Particle Settling or Surfacing

The obtained porous polyimide film is cut out in the thickness direction, and the obtained cut surface is observed with a scanning electron microscope (SEM, Hitachi High-Technologies Corporation, FE-SEM S4700).

The cut surface is bisected into two equal parts in the thickness direction, the porosity in the upper and lower cut surfaces are measured by image analysis, and the obtained measured value is substituted into the following equation (A) to obtain S.

$$S = 1 - (\text{porosity of numerical value "small"})/(\text{porosity of numerical value "large"}) \quad \text{Formula (A)}:$$

Here, the numerical value "small" represents the smaller of the measured values of the porosity above and below the cut surface bisected in the thickness direction, and the numerical value "large" represents the larger of the measured values of the porosity above and below the cut surface bisected in the thickness direction.

The degree of settling or surfacing of the particles is evaluated based on the value of S obtained by the above formula (A). The smaller the value of S, the less the particles settle or surface, and for example, S is preferably less than 0.1.

The evaluation indexes are as follows.

—Evaluation Index—
G5: S is less than 0.03
G4: S is 0.03 or more and less than 0.05
G3: S is 0.05 or more and less than 0.1
G2: S is 0.1 or more and less than 0.2
G1: S is 0.2 or more

TABLE 1

| | | Polymide precursor-containing aqueous composition | | | | | | | | | | Evaluation | |
|---|---|---|---|---|---|---|---|---|---|---|---|---|---|
| | | Polymide precursor | | Resin particles | | Polyalkylene oxide | | Water | | | | | |
| | No. | type | content (A) [% by mass] | type | content (B) [% by mass] | type | viscosity-average molecular weight | content (C) [% by mass] | content (D) [% by mass] | (C)/(A) × 100 | (C)/(B) × 100 | Viscosity [Pa · s] | Degree of settling or surfacing | Remarks |
| Example A1 | (PAA-1) | (A1) | 5.1 | (B1) | 6.8 | (C1) | 8 million to 10 million | 0.1 | 85.1 | 2.0 | 1.5 | 150 | G5 | |
| Example A2 | (PAA-2) | (A1) | 2.5 | (B1) | 6.4 | (C1) | 8 million to 10 million | 0.2 | 89.4 | 7.9 | 3.1 | 100 | G5 | |
| Example A3 | (PAA-3) | (A1) | 9.1 | (B1) | 4.3 | (C1) | 8 million to 10 million | 0.05 | 81.6 | 0.6 | 1.3 | 150 | G4 | |
| Example A4 | (PAA-4) | (A1) | 8.0 | (B1) | 4.7 | (C1) | 8 million to 10 million | 0.08 | 82.9 | 1.0 | 1.7 | 140 | G5 | |
| Example A5 | (PAA-5) | (A1) | 7.1 | (B1) | 1.4 | (C1) | 8 million to 10 million | 0.21 | 87.3 | 3.0 | 14.9 | 170 | G5 | |
| Example A6 | (PAA-6) | (A1) | 4.2 | (B1) | 10.6 | (C1) | 8 million to 10 million | 0.01 | 82.9 | 0.15 | 0.06 | 100 | G3 | |
| Example A7 | (PAA-7) | (A1) | 4.1 | (B1) | 10.3 | (C1) | 8 million to 10 million | 0.02 | 83.3 | 0.5 | 0.2 | 100 | G5 | |
| Example A8 | (PAA-8) | (A1) | 5.1 | (B1) | 6.8 | (C2) | 8 million to 10 million | 0.1 | 85.1 | 2.0 | 1.5 | 130 | G3 | |
| Example A9 | (PAA-9) | (A1) | 5.1 | (B2) | 6.8 | (C1) | 6 million to 8 million | 0.1 | 85.1 | 2.0 | 1.5 | 150 | G4 | |
| Comparative Example 1 | (PAA-10) | (A1) | 5.1 | (B1) | 6.8 | (C3) | 4.30 million to 4.80 million | 0.1 | 85.1 | 2.0 | 1.5 | 100 | G2 | |
| Comparative Example 2 | (PAA-11) | (A1) | 5.1 | (B1) | 6.8 | (C4) | (CMC) | 0.1 | 85.1 | 2.0 | 1.5 | 350 | G1 | Poor applicability |

TABLE 2

| | | Polyimide precursor | | Resin particles | | Water-insoluble fibrous organic substance | | | | Water | | | Degree | |
|---|---|---|---|---|---|---|---|---|---|---|---|---|---|---|
| | No. | type | content (A) [% by mass] | type | content (B) [% by mass] | type | fiber diameter [nm] | fiber length [nm] | content (C) [% by mass] | content (D) [% by mass] | (C)/(A) × 100 | (C)/(B) × 100 | of settling or surfacing | Evaluation Remarks |
| Example B1 | (PAA-12) | (A1) | 5.1 | (B1) | 6.8 | (C5) | 30 | 5000 | 0.1 | 85.1 | 2.0 | 1.5 | 140 | G5 |
| Example B2 | (PAA-13) | (A1) | 2.5 | (B1) | 6.4 | (C5) | 30 | 5000 | 0.2 | 89.4 | 7.9 | 3.1 | 90 | G5 |
| Example B3 | (PAA-14) | (A1) | 9.1 | (B1) | 4.3 | (C5) | 30 | 5000 | 0.05 | 81.6 | 0.6 | 1.3 | 140 | G4 |
| Example B4 | (PAA-15) | (A1) | 8.0 | (B1) | 4.7 | (C5) | 30 | 5000 | 0.08 | 82.9 | 1.0 | 1.7 | 130 | G5 |
| Example B5 | (PAA-16) | (A1) | 7.1 | (B1) | 1.4 | (C5) | 30 | 5000 | 0.21 | 87.3 | 3.0 | 14.9 | 160 | G5 |
| Example B6 | (PAA-17) | (A1) | 4.2 | (B1) | 10.6 | (C5) | 30 | 5000 | 0.01 | 82.9 | 0.15 | 0.06 | 90 | G3 |
| Example B7 | (PAA-18) | (A1) | 4.1 | (B1) | 10.3 | (C5) | 30 | 5000 | 0.02 | 83.3 | 0.5 | 0.2 | 90 | G5 |
| Example B8 | (PAA-19) | (A1) | 5.1 | (B1) | 6.8 | (C6) | 20 | 3000 | 0.1 | 85.1 | 2.0 | 1.5 | 120 | G5 |
| Example B9 | (PAA-20) | (A1) | 5.1 | (B2) | 6.8 | (C5) | 30 | 5000 | 0.1 | 85.1 | 2.0 | 1.5 | 140 | G4 |

From the results shown in Tables 1 and 2, it can be seen that by using the polyimide precursor-containing aqueous composition of Examples of the present invention, it is possible to prevent the particles from settling or surfacing in the process of producing the polyimide film.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polyimide precursor-containing aqueous composition, comprising:
   at least one polymer material selected from the group consisting of a water-insoluble fibrous organic substance and a polyalkylene oxide having a viscosity-average molecular weight of 5 million or more;
   a polyimide precursor;
   particles; and
   water,
   wherein a content of the at least one polymer material is 0.05% by mass or more and 15% by mass or less with respect to the particles.

2. The polyimide precursor-containing aqueous composition according to claim 1, wherein the content of the at least one polymer material is 0.5% by mass or more and 8.0% by mass or less with respect to the polyimide precursor.

3. The polyimide precursor-containing aqueous composition according to claim 2, wherein the content of the at least one polymer material is 1.0% by mass or more and 3.0% by mass or less with respect to the polyimide precursor.

4. The polyimide precursor-containing aqueous composition according to claim 1, wherein the polyalkylene oxide is a polyethylene oxide.

5. The polyimide precursor-containing aqueous composition according to claim 2, wherein the polyalkylene oxide is a polyethylene oxide.

6. The polyimide precursor-containing aqueous composition according to claim 1, wherein the polyalkylene oxide has a viscosity-average molecular weight of 6 million or more and 11 million or less.

7. The polyimide precursor-containing aqueous composition according to claim 1, wherein a fiber diameter of the water-insoluble fibrous organic substance is 1 nm or more and 500 nm or less.

8. The polyimide precursor-containing aqueous composition according to claim 1, wherein a fiber length of the water-insoluble fibrous organic substance is 10 nm or more and 10,000 nm or less.

9. The polyimide precursor-containing aqueous composition according to claim 1, wherein the particles are resin particles.

10. The polyimide precursor-containing aqueous composition according to claim 9, wherein the resin particles are particles containing a resin containing a structural unit derived from styrene.

11. The polyimide precursor-containing aqueous composition according to claim 1, wherein a water content is 70% by mass or more with respect to a total mass of the polyimide precursor-containing aqueous composition.

12. The polyimide precursor-containing aqueous composition according to claim 1, wherein a viscosity of the polyimide precursor-containing aqueous composition at 25° C. is 1 Pa·s or more and 200 Pa·s or less.

13. A method for producing a polyimide film, comprising:
   applying the polyimide precursor-containing aqueous composition according to claim 1 onto a substrate to form a coating film;
   drying the coating film to form a film containing at least one polymer material selected from the group consisting of the water-insoluble fibrous organic substance and the polyalkylene oxide having a viscosity-average molecular weight of 5 million or more, the polyimide precursor, and the particles; and imidizing the polyimide precursor contained in the film to forint a polyimide film.

14. A method for producing a porous polyimide film, comprising:

applying the polyimide precursor-containing aqueous composition according to claim 1 onto a substrate to form a coating film;

drying the coating film to form a film containing at least one polymer material selected from the group consisting of the water-insoluble fibrous organic substance and the polyalkylene oxide having a viscosity-average molecular weight of 5 million or more, the polyimide precursor, and the particles;

imidizing the polyimide precursor contained in the film to form a polyimide film; and removing the particles from the film or the polyimide film.

* * * * *